(12) United States Patent
Bernadet et al.

(10) Patent No.: US 8,915,470 B2
(45) Date of Patent: Dec. 23, 2014

(54) AIRCRAFT NOSE AND NOSE LANDING GEAR BAY STRUCTURE

(71) Applicant: Airbus Operations S.A.S., Toulouse Cedex (FR)

(72) Inventors: Philippe Bernadet, Colomiers (FR); Patrick Lieven, Fronton (FR); Marc Dugerie, Encausse (FR); Romain Delahaye, Colomiers (FR)

(73) Assignee: Airbus Operations S.A.S. (FR)

( * ) Notice: Subject to any disclaimer, the term of this patent is extended or adjusted under 35 U.S.C. 154(b) by 50 days.

(21) Appl. No.: 13/710,569

(22) Filed: Dec. 11, 2012

(65) Prior Publication Data

US 2013/0146709 A1    Jun. 13, 2013

(30) Foreign Application Priority Data

Dec. 12, 2011 (FR) .................................. 11 61465

(51) Int. Cl.
| | |
|---|---|
| *B64C 1/00* | (2006.01) |
| *B64C 25/04* | (2006.01) |
| *B64D 11/00* | (2006.01) |
| *B64D 45/00* | (2006.01) |
| *B64C 1/06* | (2006.01) |

(52) U.S. Cl.
CPC ................ *B64D 45/00* (2013.01); *B64C 25/04* (2013.01); *B64D 11/00* (2013.01); *B64C 1/061* (2013.01)
USPC ....................................................... 244/119

(58) Field of Classification Search
USPC ........... 244/117 R, 119, 102 R, 100 R, 129.4, 244/129.1
See application file for complete search history.

(56) References Cited

U.S. PATENT DOCUMENTS

| | | | |
|---|---|---|---|
| 2,437,574 A * | 3/1948 | Watter et al. | 244/117 R |
| 7,641,146 B2 * | 1/2010 | Wood et al. | 244/119 |
| 7,798,444 B2 * | 9/2010 | Wood | 244/102 A |
| 7,891,606 B2 * | 2/2011 | Guering | 244/102 R |
| 8,256,711 B2 * | 9/2012 | Guering et al. | 244/102 R |
| 8,366,041 B2 * | 2/2013 | Ricaud et al. | 244/119 |
| 2008/0173765 A1 | 7/2008 | Muller et al. | |
| 2008/0223984 A1 * | 9/2008 | Guering | 244/102 R |
| 2009/0078822 A1 * | 3/2009 | Wood | 244/102 R |
| 2009/0078823 A1 * | 3/2009 | Wood et al. | 244/119 |
| 2009/0159743 A1 * | 6/2009 | Guering et al. | 244/102 R |
| 2009/0283637 A1 * | 11/2009 | Nolla | 244/119 |
| 2009/0294587 A1 * | 12/2009 | Ricaud et al. | 244/119 |
| 2010/0176240 A1 * | 7/2010 | Guering et al. | 244/102 R |

FOREIGN PATENT DOCUMENTS

| | | |
|---|---|---|
| FR | 2905929 A1 | 3/2008 |
| FR | 2917369 A1 | 12/2008 |
| WO | 2008006956 A1 | 1/2008 |

\* cited by examiner

*Primary Examiner* — Philip J Bonzell
(74) *Attorney, Agent, or Firm* — Lerner, David, Littenberg, Krumholz & Mentlik, LLP

(57) ABSTRACT

An aircraft nose structure includes a fuselage, a floor for a pressurized space and a nose landing gear bay arranged under the floor, on the opposite side to the space. The bay includes walls that form a pressure barrier, of which there are two lateral panels mechanically secured to the floor by load-reacting members, an upper panel adjacent to the floor and extending between the lateral panels, and a rear panel extending between the upper panel and the fuselage.

9 Claims, 2 Drawing Sheets

AIRCRAFT NOSE AND NOSE LANDING GEAR BAY STRUCTURE

FIELD OF THE INVENTION

The invention relates to an aircraft nose structure provided with a nose landing gear bay, and to an aircraft provided with such a structure.

BACKGROUND OF THE INVENTION

An aircraft has a nose landing gear housed, when retracted, in a landing gear bay. This nose landing gear bay is usually located partially or completely under the floor of the aircraft flight deck.

In a conventional layout, the nose landing gear bay forms a box secured to the fuselage of the aircraft around an opening through which the landing gear can be lowered out of the bay in the landing configuration and retracted into the bay in the flight configuration. Moving doors close this opening in the flight configuration and open downwards when the landing gear is lowered.

The walls of such a nose landing gear bay are reinforced by a framework in order, firstly, to withstand the loads transmitted through the landing gear and, secondly, to form a pressure barrier. This is necessary because the walls of the nose landing gear bay are subjected, inside the bay, to the prevailing atmospheric pressure at the flight altitude and, outside the bay, to the prevailing pressure inside the aircraft in the pressurized region.

Document WO 2008/006956 discloses an aircraft nose landing gear bay of the type having an upper face partially forming a floor for a pressurized space of the aircraft.

BRIEF SUMMARY OF THE INVENTION

An aspect of the invention provides an aircraft nose structure that is optimized, notably from the mass standpoint, for a nose landing gear bay substantially of this type.

To this end, one embodiment of the invention is an aircraft nose structure comprising a fuselage, a floor for a pressurized space and a nose landing gear bay arranged under the floor, on the opposite side to the space, and comprising walls that form a pressure barrier, this structure being notable in that the pressure-barrier walls comprise at least two lateral panels mechanically secured to the floor by load-reacting members.

An advantage of this layout is that the lateral panels perform the dual function of acting as a pressure barrier and of transmitting to the floor the significant loadings applied to it by the shafts of the nose landing gear and struts that control it. These loadings are transmitted directly, with no intermediate components other than the load-reacting members, to the floor and, from there, to the wall of the fuselage via fuselage frames to which the floor is fixed.

According to one feature of the invention, the pressure-barrier walls comprise at least one upper panel adjacent to the floor and extending between the lateral panels. The upper panel does not absorb the significant loads applied by the landing gear and reacted by the floor: it is therefore designed solely to act as a pressure barrier and withstand impacts associated with the bursting of a landing gear tire.

According to another feature of the invention, the floor comprises crossmembers for reinforcing the upper panel. Thus, the floor crossmembers perform both the usual functions of stiffening the framework of the fuselage and of the floor itself, and those of transmitting to the fuselage loads originating from the nose landing gear and of reinforcing the pressure-barrier upper panel.

According to another feature of the invention, the floor comprises, between the crossmembers, load-reacting webs extending between the lateral panels and the fuselage. Like the crossmembers, these floor anti-shear webs contribute to reacting the loads transmitted by the landing gear.

In a preferred embodiment, the webs each comprise a flange mechanically secured to one of the lateral panels, thus providing a simple connection between these webs and the lateral panels.

According to another feature of the invention, the pressure-barrier walls comprise, between the lateral panels, a rear panel extending between the upper panel and the fuselage. This rear panel performs the same pressure-barrier function as the upper panel and, to a lesser extent than the latter, contributes to the stiffness of the bay. It can be designed accordingly.

According to another feature of the invention, the lateral panels comprise reinforcing uprights and the load-reacting members are components each respectively fixed to one of the reinforcing uprights and to one of the floor crossmembers. The means of transmitting loads from the lateral panels to the floor are thus particularly simple and easy to design.

In a preferred embodiment, the structure comprises crossmembers for reinforcing the rear panel running transversely between the ends of two of the reinforcing uprights. These crossmembers make it possible both to stiffen the bay in regions in which the lateral panels are not secured to the floor, and to reinforce the rear panel in its pressure barrier function.

According to another feature of the invention, the load-reacting members are angle brackets.

According to yet another feature of the invention, the upper panel comprises longitudinal rims for connection with the lateral panels, the longitudinal rims each being clamped between one of the lateral panels and the load-reacting members. Thus, the load-reacting members also contribute towards obtaining an effective pressure barrier where the lateral panels meet the upper panel.

Another embodiment of the invention includes an aircraft provided with a nose structure comprising one or more of the above features considered alone or in combination.

When this aircraft comprises a cabin provided with a cabin floor and a flight deck provided with the floor under which the nose landing gear bay is located, for preference, the flight deck floor is located at a lower level than the cabin floor. An advantage of the compactness of the nose landing gear bay layout afforded by the above-defined aircraft nose structure is that the floor of the flight deck can be lowered down to the level strictly necessary for housing the nose landing gear and, if appropriate, to below the level of the cabin floor of the aircraft (assumed to be in a horizontal position). One significant advantage of such a lowering of the flight deck floor is that it makes it possible, for roughly the same flight deck volume, to reduce the exterior surface area of the aircraft nose cone, and therefore the drag thereof.

Further features and advantages of the invention will emerge from the following description of one embodiment given solely by way of example and illustrated by the attached drawings in which.

Figure 1:
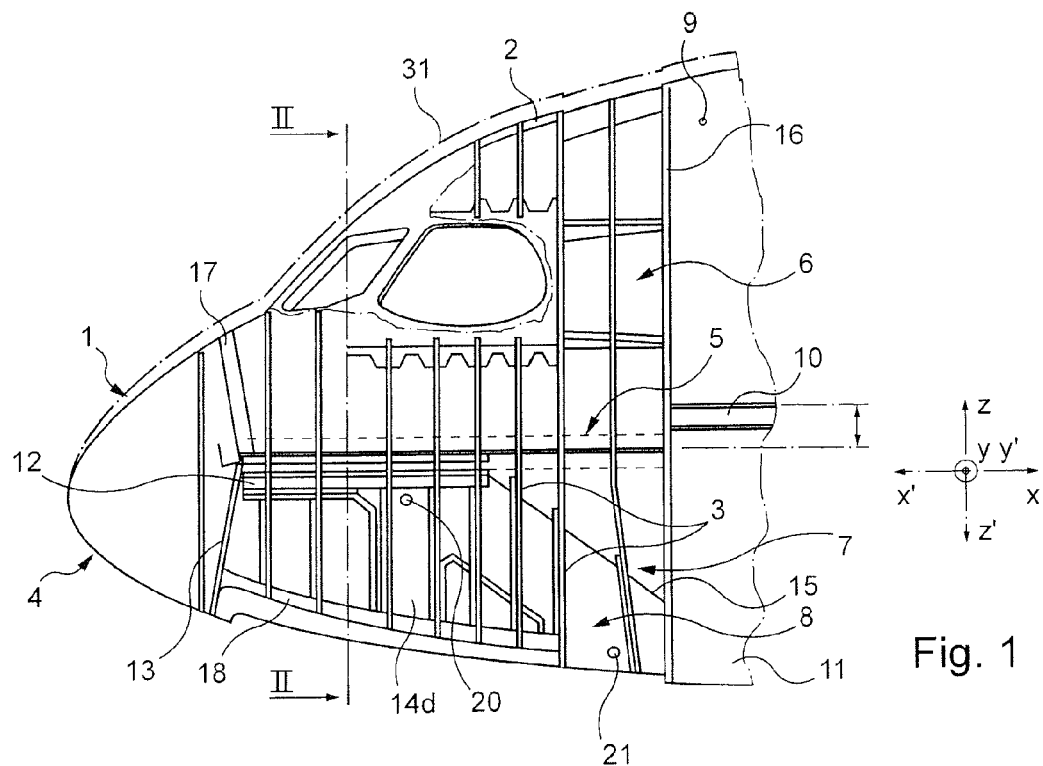
FIG. 1 is a partial view in side elevation, with partial cutaway, of an aircraft nose section that has a structure according to the invention.
Figure 2:
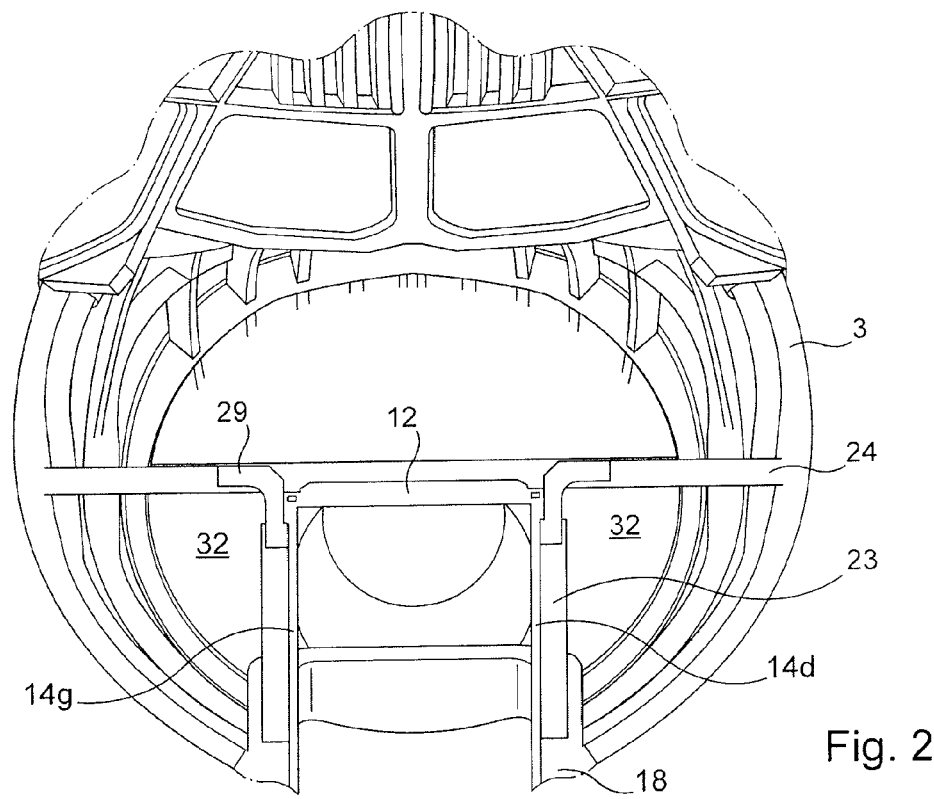
FIG. 2 is a partial view in cross section, on 2-2 of FIG. 1, of the aircraft nose section structure according to the invention.
Figure 3:
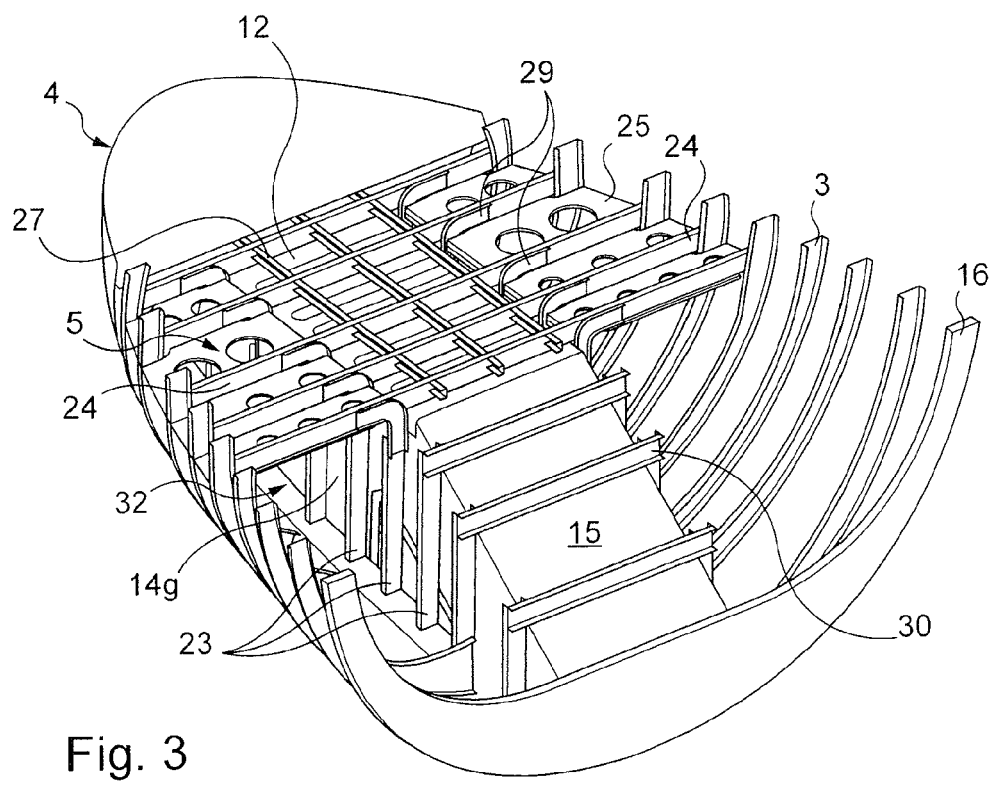
FIG. 3 is a perspective view with partial cutaway of the aircraft nose section structure of FIGS. 1 and 2.

With reference to FIGS. 1 to 3, an aircraft nose structure comprises a nose section 1 of a fuselage, of median axis XX' in an orthonormal frame of reference of axes X, Y, Z, in which the axis Y-Y' connects the wing tips (not depicted) of the aircraft. The fuselage nose section 1 comprises an exterior wall or skin 2 fixed to structural transverse fuselage frames 3 which are substantially parallel to one another and perpendicular to the XZ plane.

The fuselage nose section 1 comprises, at its front end, a nose 4 which contains electronic equipment (not depicted) such as a radar for example.

Behind the nose 4, the fuselage nose section 1 is divided into two compartments by a floor 5 parallel to the XY plane.

In the compartment 6 situated above the floor 5 is an aircraft flight deck, whereas the compartment 7 situated under the floor 5 contains a landing gear bay 8 (for the sake of the clarity of the drawing, the landing gear has not been depicted).

The compartment 6 is extended rearwards by a compartment or cabin 9 situated above a floor 10 and intended to accommodate passengers or cargo.

The compartment 7 is extended rearwards, below the floor 10, by a hold 11 intended to accommodate cargo, luggage, an avionics bay, etc.

The landing gear bay 8 is delimited at the top by an upper panel or roof 12, at the front by a transverse bulkhead 13, laterally by lateral panels 14g and 14d, and at the rear, firstly, by a rear panel 15 which extends obliquely downwards (along the axis ZZ') between the rear edge of the upper panel 12 and a fuselage frame 16 and, secondly, by the lower part of the fuselage frame 16 which extends between the rear edge of the rear panel 15 and the wall 2 of the fuselage nose section 1.

In the example depicted, the fuselage frame 16 marks the division between the flight deck 6 and the cabin or compartment 9 by means of a bulkhead (not depicted), although this dividing bulkhead could just as well be positioned in front of or behind the fuselage frame 16.

The interior volume of an aircraft the nose section of which is depicted in the figures comprises:

a pressurized region notably comprising the flight deck (compartment 6), the compartment 9 that accommodates the passengers or cargo, the hold 11 and lateral volumes 32 situated on either side of the landing gear bay lateral panels 23, and a non-pressurized zone subjected to the prevailing atmospheric pressure at the altitude at which the aircraft is flying, and comprising the interior volumes of the nose 4 of the aircraft and of the landing gear bay 8.

In the fuselage nose section 1, the division between the pressurized and unpressurized zones is embodied by a certain number of bulkheads or panels designed to form a pressure barrier and which comprise:

an upper transverse bulkhead 17, preferably planar, which, above the floor 5, separates the flight deck 6 or compartment, which is pressurized, from the space inside the nose 4, which is not pressurized, the lower transverse bulkhead 13, preferably planar, which not only closes the bay 8 in its front part, but connects to the bulkhead 17 and to the fuselage nose section 1 to achieve a pressuretight division between the space inside the nose 4 and that of the compartment 7, on either side of the lateral panels 14d and 14g of the bay 8;

the upper panel or roof 12 of the bay 8, which is planar and positioned under and against the floor 5; this upper panel 12 is connected in a pressuretight manner, firstly laterally to the lateral panels 14d and 14g and secondly at the front to the transverse bulkheads 13 and 17;

the lateral panels 14d and 14g of the bay 8 which are planar and have a substantially polygonal overall shape; these lateral panels 14d and 14g are each connected in a pressuretight manner:

to the transverse bulkhead 13 along a front edge;
to the upper panel 12 along an upper edge,
to the rear panel 15 along an inclined first rear edge;
to the lower part of the transverse fuselage frame 16 along a second rear edge which is located in the plane of this fuselage frame 16, and
to a reinforcing fuselage frame or box section 18 which delimits the opening through which the landing gear passes and to which the transverse frames 3 of the fuselage 2 are connected in the region of the bay 8; and the rear panel 15 of the bay which is connected in a pressuretight manner to the upper panel 12, to the lateral panels 14d and 14g along their first rear edge, and to the lower part of the fuselage frame 16.

These panels and bulkheads are joined together by joining elements that are either added on or form part of one or other of the connected panels as described hereinafter with regard to the connection between the upper panel 12 and the lateral panels 14d, 14g. The upper 17 and lower 13 transverse bulkheads and the upper 12, lateral 14d, 14g, and rear 15 panels are preferably made of a metallic or composite material.

As a result, the space inside the fuselage 2 which surrounds the bay 8 to the rear of the bulkheads 13 and 17 forms part of the pressurized zone of the aircraft and the bay 8, the interior volume of which is at atmospheric pressure, constitutes an enclave within this pressurized zone.

Significant loadings are transmitted by the landing gear, particularly during landing phases, to the lateral panels 14d and 14g via bearings 21 carrying the shafts about which the legs (not depicted) supporting the wheels of the landing gear are articulated and bearings 20 carrying the shafts about which the struts (not depicted) which control the lowering and retraction of the landing gear (not depicted) are articulated. Further, the lateral panels 14d and 14g are also subjected to the loadings resulting from the pressurization.

In order to be able to absorb these loads, the lateral panels 14d and 14g are reinforced on the outside of the bay 8 by uprights 23 made of a metallic or composite material which are fixed to them and which run parallel to one another, for example along the axis ZZ' in instances in which the lateral panels 14d and 14g are perpendicular to the floor 5. The uprights 23 preferably have a T-shaped, C-shaped, I-shaped, or some other shaped profile, the main flange of which is fixed to the panels 14d and 14g by fixing means (not depicted) or incorporated directly into the panels 14d and 14g.

In line with the upper panel 12, the uprights 23 do not extend over the full height of the lateral panels 14d and 14g. Their upper end 23a stops short of the upper edge of the lateral panels 14d and 14g and thus leaves a flat strip against which the upper panel 12 is fixed as indicated hereinbelow. At their lower end, the uprights 23 are fixed to the reinforcing frame or box section 18 or to one of the transverse fuselage frames 3, depending on whether or not they are in line with the opening of the bay 8.

The floor 5 in the conventional way comprises crossmembers 24 made of a metallic or composite material, of IPN or UPN profile which extend transversely on either side of the fuselage 2 and are fixed at each of their respective ends to a transverse fuselage frame 3. Because they are anchored to the transverse fuselage frames 3, the crossmembers 24 contribute in the way known per se to the stiffness of the aircraft fuselage nose section 1.

Fixed between the crossmembers 24 are shear webs which, in the region of the upper panel 12, extend between the adjacent edge of the upper panel 12 and the wall of the fuselage 2.

Figure 4:
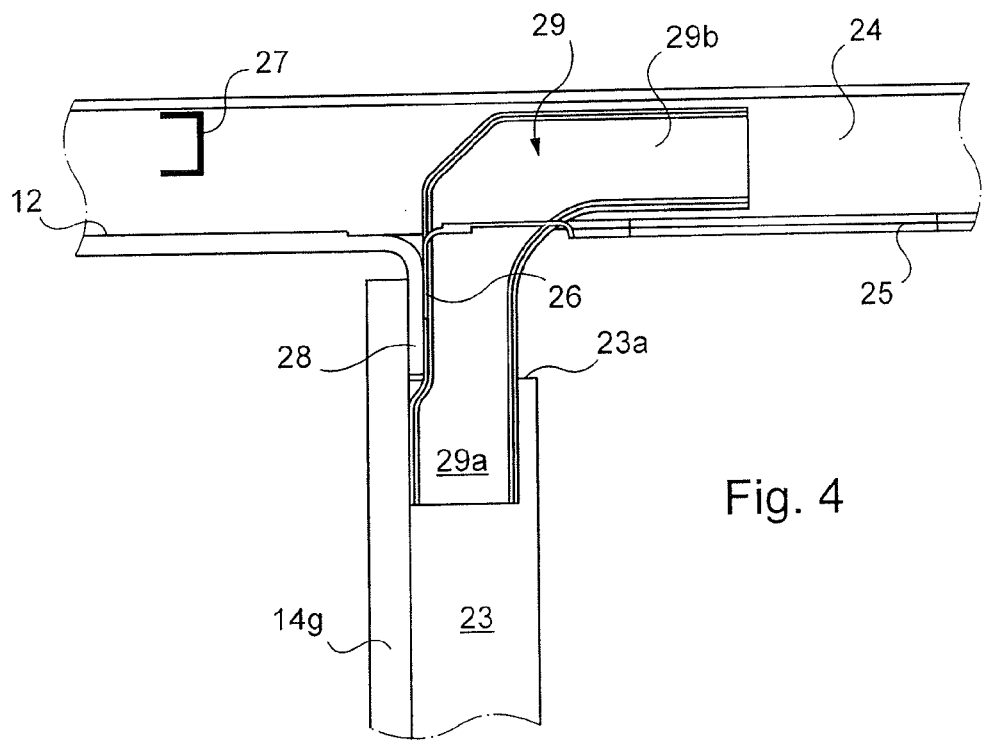
FIG. 4 is an elevation of a detail of the mechanical connection between elements of the aircraft nose section structure illustrated in FIG. 2.

As depicted in greater detail in FIG. 4, the shear webs 25 comprise, on the side of the lateral panels 14d and 14g, a flange 26 at a right angle.

Finally, the floor 5 comprises, in the region covering the upper panel 12, spars 27 made of a metallic or composite material and which, with the crossmembers 24, contribute to reinforcing the upper panel 12 subjected to the loadings of pressurization. The spars (which have not been depicted in their entirety) 27 extend from the transverse bulkhead 17 to the fuselage frame 16. They stabilize the floor and provide retention for the panel 17 when the latter is subjected to the pressurization. Other spars 27 (not depicted in the figures) extend on each side of the landing gear bay 8.

The upper panel 12 is fixed by its upper face to the crossmembers 24 by fixing means (not depicted) which are conventionally used in pressuretight zones. The crossmembers have three functions: they react the fuselage 1 pressurization loadings, they stabilize and reinforce the landing gear bay roof 12, and they support the flight deck 6 floor that is walked on.

In order to connect the upper panel and the lateral panels in a pressuretight manner, the upper panel 12 has lateral rims at right angles 28 which are fixed by conventional fixing means against the flat strip of the exterior face of the lateral panels 14d and 14g which extends between their upper edge and the upper ends of the uprights 23. As an alternative, the upper panel 12 may be flat and the longitudinal rims may consist of added-on joining elements of the angle bracket type or, alternatively, the lateral panels may comprise lateral rims for fixing them to the flat upper panel 12.

These lateral rims 28 and the flanges 26 of the shear webs 25 are kept clamped against the exterior faces of the lateral panels 14d and 14g by bracket-shaped load-reacting components 29 made of a metallic or composite material. The components 29 are each fixed by one 29a of their flanges to the flange of one of the uprights 23 and by the other 29b of their flanges to the flange of one of the crossmembers 24 by conventional fixing means (not depicted). For that purpose, the webs 25 have slots (not visible in the drawing) through which the bracket-shaped components 29 can pass.

Finally, the rear panel 15 of the bay 8 is likewise reinforced by crossmembers 30 made of a metallic or composite material which are specific to the bay 8. The crossmembers 30 are parallel to those of the floor 5 (and to the XY plane) and fixed by conventional fixing means (not depicted) at their ends to the respective ends of two uprights 23. The crossmembers 30 and the corresponding uprights 23 thus form portal frames which are anchored to the fuselage frame 18 and flank the lateral panels 14d and 14g and the rear panel 15.

Thanks to the above-described aircraft nose section structure, all the loads applied by the landing gear to the lateral panels 14d and 14g are transmitted to the floor 5 and, from there, are reacted by the wall 2 of the aircraft fuselage. The above-described aircraft nose section structure optimizes mass because this transmission of load from the landing gear is obtained using a minimum number of components and because just one subassembly, the floor, reacts the loads transmitted by the landing gear and those resulting from the pressurization.

Finally, because of the compactness achieved by imbricating the landing gear bay 8 with the floor 5, the latter can be lowered (along the axis ZZ') by comparison with the position that it occupies in a conventional configuration in which the flight deck floor and the nose landing gear bay are independent. As FIG. 1 shows, the floor 5 can be situated below the level of the floor 10 of the cabin or compartment 9, unlike in the state of the art of aircraft of the same type in which the flight deck and the cabin or cargo or passenger compartment are at the same level (rather than at different levels as may be the case for very large transport aircraft).

As a result of this lowering of the floor 5, the surface area of the fuselage nose section 1 of the aircraft can, for substantially the same flight deck volume, be reduced as shown in FIG. 1: the outline 31 drawn in chain line shows what the exterior surface of the fuselage nose section 1 would be if the floor 5 extended in the continuation of the cabin floor 10.

This reduction in the surface area of the fuselage nose section 1 results in a reduction in drag and, therefore, in aircraft fuel consumption. The reduction in exterior surface area also leads to a reduction in mass.

The invention claimed is:

1. An aircraft nose structure comprising:
    a fuselage;
    a floor for a pressurized space; and
    a nose landing gear bay arranged under the floor, on the opposite side to said pressurized space and comprising a plurality of walls forming a pressure barrier,
    wherein said pressure-barrier walls comprise at least first and second lateral panels mechanically secured to said floor by at least one load-reacting member,
    wherein said pressure-barrier walls comprise at least one upper panel adjacent to said floor and extending between said lateral panels,
    wherein said floor comprises at least first and second crossmember for reinforcing said upper panel, and
    wherein said floor comprises, between said crossmembers, a plurality of load-reacting webs extending between said lateral panels and said fuselage.

2. The aircraft nose structure according to claim 1, wherein each of said plurality of webs comprises a flange secured to one of said lateral panels.

3. The aircraft nose structure according to claim 1, wherein said pressure-barrier walls comprise, between said lateral panels, a rear panel extending between said upper panel and said fuselage.

4. The aircraft nose structure according to claim 1, wherein said lateral panels comprise a reinforcing upright, and wherein said load-reacting member is a component respectively fixed to one of said reinforcing upright and to one of said floor crossmembers.

5. The aircraft nose structure according to claim 4,
    further comprising a plurality of crossmembers for reinforcing said rear panel running transversely between the ends of two of said reinforcing uprights.

6. The aircraft nose structure according to claim 4, wherein said load-reacting members are angle brackets.

7. The aircraft nose structure according to claim 4, wherein said upper panel comprises first and second longitudinal rims for connection with said lateral panels, said first and second longitudinal rims each being clamped between one of said lateral panels and said load-reacting members.

8. An aircraft comprising a nose structure, said nose structure comprising:
    a fuselage;
    a floor for a pressurized space; and a nose landing gear bay arranged under the floor, on the opposite side to said pressurized space and comprising a plurality of walls forming a pressure barrier, wherein said pressure-barrier walls comprise at least first and second lateral panels mechanically secured to said floor by at least one load-reacting member, wherein said pressure-barrier walls comprise at least one upper panel adjacent to said floor and extending between said lateral panels, wherein said floor comprises at least first and second crossmember for reinforcing said upper panel, and wherein said floor comprises, between said crossmembers, a plurality of load-reacting webs extending between said lateral panels and said fuselage.

9. The aircraft according to claim 8, further comprising:
a cabin comprising a cabin floor; and
a flight deck comprising a flight floor, wherein said nose landing gear bay is located under the flight deck;
wherein said flight deck floor is located at a lower level than the cabin floor.

* * * * *